(12) United States Patent
Foucault

(10) Patent No.: US 9,371,924 B2
(45) Date of Patent: Jun. 21, 2016

(54) ONE-PIECE FLAP DEVICE, INJECTION-MOULDED FROM ELASTIC MATERIAL

(75) Inventor: Frederic Foucault, Craponne (FR)

(73) Assignee: BIOMERIEUX, Marcy l'Etoile (FR)

( * ) Notice: Subject to any disclaimer, the term of this patent is extended or adjusted under 35 U.S.C. 154(b) by 697 days.

(21) Appl. No.: 13/574,729

(22) PCT Filed: Feb. 15, 2011

(86) PCT No.: PCT/FR2011/050319
§ 371 (c)(1),
(2), (4) Date: Jul. 23, 2012

(87) PCT Pub. No.: WO2011/101588
PCT Pub. Date: Aug. 25, 2011

(65) Prior Publication Data
US 2012/0298665 A1 Nov. 29, 2012

(30) Foreign Application Priority Data
Feb. 16, 2010 (FR) ...................................... 10 51080

(51) Int. Cl.
*F16K 15/03* (2006.01)
*B01L 3/00* (2006.01)
*F16K 15/18* (2006.01)

(52) U.S. Cl.
CPC ........... *F16K 15/031* (2013.01); *B01L 3/50825* (2013.01); *F16K 15/185* (2013.01); *B01L 2300/043* (2013.01); *B01L 2400/0638* (2013.01); *B01L 2400/086* (2013.01)

(58) Field of Classification Search
CPC ........... B65D 47/0842; B65D 47/2018; B65D 47/249; B65D 51/04; B65D 39/00; B65D 2543/0037; B65D 2543/00046; B01L 3/50825; B01L 2300/042–2300/043; B01L 2300/049; B01L 2400/0638; A61B 10/007; A61B 19/0288; A61B 2010/0009; F16K 15/031; F16K 15/181; F16K 15/185
USPC .......................... 215/235–236, 289, 325, 387; 220/254.1, 254.3–254.6, 711, 220/714–715, 719; 137/232–234, 454.2, 137/527, 527.2, 855
See application file for complete search history.

(56) References Cited

U.S. PATENT DOCUMENTS 1,879,205 A * 9/1932 Gunn ............................ 222/506
3,613,720 A * 10/1971 Welch ......................... 137/527.8

(Continued)

FOREIGN PATENT DOCUMENTS

| DE | 10 2007 048 556 B3 | 2/2009 |
|---|---|---|
| EP | 1 407 820 A1 | 4/2004 |
| GB | 2 342 427 A | 4/2000 |

OTHER PUBLICATIONS

Aug. 1, 2011 Written Opinion in International Patent Application No. PCT/FR2011/050319.

*Primary Examiner* — J. Gregory Pickett
*Assistant Examiner* — Brijesh V. Patel
(74) *Attorney, Agent, or Firm* — Oliff PLC

(57) ABSTRACT

A one-piece flap device made of elastic material, which separates two distinct volume spaces. The one-piece flap device includes:
a) a substantially cylindrical body including a through conduit,
b) a flap that seals an aperture of the through conduit of the body when the flap is in a closed position and is within said body, and
c) an arm connecting the body of the device to the flap.
The arm is in an elastic stress position regardless of the position of the flap when inside said body.

15 Claims, 3 Drawing Sheets

(56) References Cited

U.S. PATENT DOCUMENTS

| | | | |
|---|---|---|---|
| 3,749,274 A * | 7/1973 | Mele et al. | 220/825 |
| 3,952,914 A * | 4/1976 | Vogt | 220/825 |
| 4,138,033 A * | 2/1979 | Payne et al. | 220/254.3 |
| 4,190,174 A * | 2/1980 | Haimowitz | 220/254.6 |
| 5,202,093 A * | 4/1993 | Cloyd | 215/247 |
| 5,370,252 A * | 12/1994 | Parsons et al. | 215/247 |
| 5,706,972 A * | 1/1998 | Sousa | 220/714 |
| 5,894,950 A * | 4/1999 | Kick | 220/268 |
| 6,138,711 A * | 10/2000 | Lung-Po | 137/527.8 |
| 6,149,866 A * | 11/2000 | Luotola et al. | 422/401 |
| 6,244,455 B1 * | 6/2001 | Lastik | 220/254.3 |
| 6,783,018 B1 * | 8/2004 | Rondeau | 220/254.3 |
| 7,473,399 B2 | 1/2009 | Dehmer | |
| 7,686,182 B1 * | 3/2010 | Shukri | 220/711 |
| 2003/0164559 A1 | 9/2003 | Rhea et al. | |
| 2004/0067169 A1 * | 4/2004 | Krause | 422/100 |
| 2005/0263523 A1 * | 12/2005 | Moss | 220/229 |
| 2007/0009390 A1 | 1/2007 | Giusti | |
| 2007/0131689 A1 * | 6/2007 | Felber | 220/254.3 |
| 2008/0228163 A1 * | 9/2008 | Smith | 604/411 |
| 2010/0206914 A1 * | 8/2010 | Doron | 222/517 |

* cited by examiner

Section A-A

ONE-PIECE FLAP DEVICE, INJECTION-MOULDED FROM ELASTIC MATERIAL

TECHNICAL FIELD

The technical field of the present invention is that of devices intended to ensure a container's fluid-tightness, such as a stopper, or for ensuring the fluid-tightness between two distinct volume spaces, such as a valve.

BACKGROUND

In systems of biological analysis, in particular systems of in vitro diagnosis, it is conventional to use disposable plastic tubes intended for receiving different types of liquid and more particularly biological liquids such as whole blood, serum, urine, cerebrospinal fluid or else joint fluids.

If these tubes can be plugged for transport using conventional hard plastic stoppers, the use of these tubes inside the abovementioned systems obliges the handlers to remove the stoppers before installing said tubes in the machine. This handling entails a potential risk of the handler being contaminated by the liquids contained in the tubes. The handler can likewise pose a source of contamination of the biological liquids and therefore thus vitiate the analysis results.

A solution to this problem consists in using stoppers made of a natural or synthetic rubber-based material, jointly referred to as septums, which allow the passage of a metal needle by piercing due to the rigidity and the sharp edge of this latter and which, as a result of their elasticity properties, close again when the needle is withdrawn. Nevertheless such a stopper is not suitable for pipetting devices using disposable plastic cones. Indeed, due to the large size of its tip, the cone is not able to pierce the stopper, without excessive pressure which is liable to cause the material to deteriorate.

Other devices have been developed to allow the passage of plastic cones and a fortiori metal needles to pass without unscrewing the stopper.

Mention can be made of stoppers of the "cross-slit valves" type, such as those produced by the companies Minivalve (CR 150.001, CR270.001 . . . ) and Vernay (VA4394, VA5904 . . . ). These stoppers are originally designed to allow the passage of a trocar. These stoppers are injected and then cut in a cross.

These stoppers are very often made of silicone or cross-linked rubber. The deployment of silicones or rubbers necessitates specific production methods, in order to allow the cross-linking of the materials directly in the mould. This leads to not insignificant elongation of the turn-around time. Finally, if a resumption of machining is necessary, such as a cut-out in the produced item (such as a cross-shaped cut-out in the base of the stopper), this has a direct impact on the manufacturing cost and therefore the cost price of the product.

These same problems also present themselves with the similarly designed devices as with the valves of the "cross-slit" type or of the "duckbill" type, which are used to transfer a liquid between two distinct volume spaces.

Furthermore, these prior art valves based on the principle of deformation of a flexible material have the same problem, namely a limited free passage which is proportional to the flow, but which leads to significant losses of load.

There are other types of stoppers made of several assembled or co-injected pieces. There is generally an elastomer central part and a peripheral made of hard thermoplastic, this latter allowing the stopper to be fixed by clipping or screwing onto the device to be sealed.

However, the two-material injection (or co-injection) is a technologically hard method, which in particular requires special moulds and special injection-moulding machines. The items thus produced are therefore clearly more expensive than those produced through mono-injection. Furthermore, the assembly is an extra step which also contributes to raising the cost price of the product.

All of these devices, stoppers or valves, are thus expensive to produce for the disposable consumable market. Indeed, a consumable is often used only once in biological analysis. As a consequence, its industrial cost price must be as low as possible.

The document EP-A-1 407 820 describes a flapped septum intended to be positioned on a tube. The flap made of plastic is connected to a circular joint by means of a leaf spring. The flap which is oblong-shaped whereas the section of the container is itself circular, impedes a complete lifting of the flap. Such an architecture thus confers a limited fluid-tightness upon said flap. Which can be a major disadvantage in certain uses in which fluid-tightness is a crucial element.

The document GB-A-2 342 427 describes a pipe having a flap which is attached to the pipe by means of a hinge which is presented in the form of a strip which is deformed when the flap is positioned at the end of the pipe. The flap also has a loop on its peripheral part which fixes on a lug arranged on the outer wall of the pipe, and prevents the flap from becoming detached from the pipe. The architecture allows the flap to move away from the tip of the pipe because of its flexible structure to allow a liquid which flows in the pipe to exit from this latter. Nevertheless, such a flap architecture is by no means suitable to be positioned on a container which it is necessary to have penetrated by a pipetting device.

It can be seen from this state of the art that there is no stopper which combines both practicality and ease of use, and which, particularly when positioned on an analysis tube containing a liquid sample, makes it possible to be able to easily take a fraction from the sample using a pipetting device; this is combined with a simplicity of design which does not entail prohibitive production costs and therefore a cost price which is incompatible with a single use.

It also emerges from this state of the art that there are also no valves which are practical and simple to use, combining a full opening and an effective non-return flap system, such valves having to have a limited production cost which is compatible with single use.

SUMMARY

The objectives of the present invention are therefore to respond to these deficiencies by proposing a single-material and one-piece device which is simply designed, easy to produce and which can be used:

Either as a stopper in order to permit a pipetting device to easily access the interior of a tube onto which the stopper is placed, whilst guaranteeing perfect fluid-tightness with respect to the liquids of said tube Or as a valve in order to allow the efficient transfer of a liquid between two distinct volume spaces, whether in the case of tubing or containers.

These objectives amongst others are achieved by the present invention which primarily relates to a flap device of one-piece type, made of elastic material, which separates two distinct volume spaces, said device comprising:

a) A substantially cylindrical body, presenting a through conduit, b) A flap which seals the aperture of the through conduit of said body, when the device is in a closed position;

c) An arm connecting the body of said device to said flap, said arm being in an elastic stress position, regardless of the position of the flap.

According to a particular embodiment of the device according to the invention, the arm connects the body of said device to said flap through the through conduit of said body. This is effected by the exterior of said device.

Advantageously, the elastic material is taken from the group including: thermoplastic elastomers; cross-linked or vulcanised elastomers; silicones; fluorosilicones; fluorinated elastomers; polyisoprenes; natural butyl or nitrile rubbers; fluorocarbon polymers.

According to a particular embodiment of the device, the flap is substantially flat.

According to a preferred embodiment, the flap of the device comprises deformation means, which facilitate the deformation of said flap.

According to a particular embodiment, the body of the device comprises at least one peripheral lip.

According to a particular embodiment of the device according to the invention, the flap comprises means intended to facilitate the sliding of an object which allows said flap to open.

Advantageously, the body of the device has a shape capable of allowing it to be positioned on a container.

According to an alternative, the body of the device has a shape capable of allowing it to be positioned at the interface between a source container and a destination container or between upstream tubing and downstream tubing.

Another object of the present invention relates to the use of the device as a stopper.

Another object of the present invention relates to the use of the device as a valve.

Another object of the present invention relates to a method of transferring a liquid between a source volume space and a destination volume space, the two volume spaces being separated by a device according to the invention, used as a valve, said method including the steps consisting of:

a) Exerting, by means of the fluid to be transferred, a pressure on the flap of the valve, said pressure being sufficient to allow said flap to open, causing the arm of said valve to be placed under an elastic stress;

b) Maintaining the pressure for a period of time sufficient to allow the transfer of the desired volume of fluid;

c) Discontinuing the pressure in order to cause the flap to return into the closed position, as a result of the elastic return force exerted by the arm of said valve.

Another object of the present invention relates to a method of taking a fraction from a liquid sample contained in a container, sealed by a device according to the invention, used as a stopper, said method comprising the steps consisting of:

a) Exerting a pressure by means of an aspiration/discharge on the flap of the stopper, which is in the closed position, in order to allow the latter to be opened, causing the arm of said stopper to be placed under an elastic stress;

b) Causing the aspiration/discharge device to penetrate into the container, until the tip of the aspiration/discharge device, is immersed in the liquid sample;

c) Aspirating a determined volume of said liquid sample;

d) Withdrawing the aspiration/discharge device, such that the pressure exerted on the flap is discontinued, causing the flap to return into the closed position, due to the elastic return force exerted by the arm of said stopper.

Another object of the present invention relates to a method of dispensing a liquid into a container sealed by a device according to the invention, used as a stopper, said liquid being contained in an aspiration/discharge device, said method comprising the steps consisting of:

a) Exerting a pressure by means of an aspiration/discharge device on the flap of the stopper, which is in the closed position, in order to allow the latter to be opened, causing the arm of said stopper to be placed under an elastic stress;

b) Causing the aspiration/discharge device to penetrate into the container;

c) Dispensing into the interior of the container a determined volume of the liquid contained in the aspiration/discharge device;

d) Withdrawing the aspiration/discharge device from the container, such that the pressure exerted on the flap is discontinued, causing the flap to return into the closed position, due to the elastic return force exerted by the arm of said stopper.

The aims and advantages of the present invention shall be better understood in light of the following detailed description, which by no means limits the invention and which is made with reference to the drawings.

DETAILED DESCRIPTION

Figure 1:
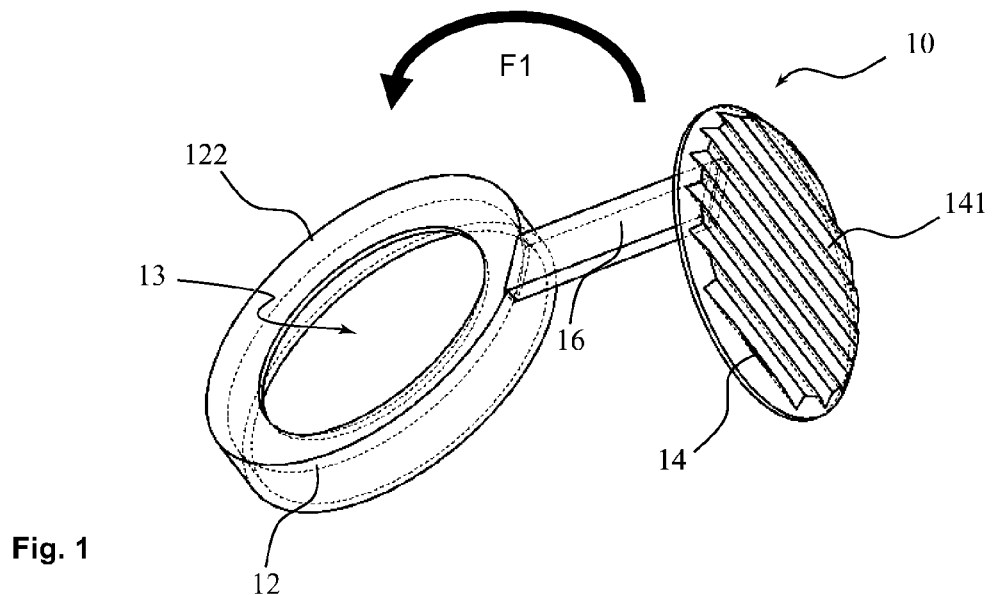
FIG. 1 shows the device according to the present invention, in the form of a stopper in perspective view, in its initial non-functional configuration.

In accordance with FIG. 1, the device according to the invention in the form of a stopper 10 is constituted of three distinct parts. Firstly, a substantially cylindical body 12, with a circular cross-section. This cylinder is constituted of a substantially vertical cylindrical wall 121. At one of its ends, the body 12 has a peripheral lip 122 in the form of a circular band, perpendicular to the wall 121 of the body, which reduces the inner diameter of the cylinder at this end. This is clearly seen in FIG. 3.

The stopper 10 further comprises a flap 14. This flap 14 has a substantially truncated-cone shape. The diameter of the flap 14 is smaller than the diameter of the body 12 in its widest area. Conversely, it is greater than the diameter of the body at the peripheral lip 122, such that the flap can freely move in rotation inside the through conduit 13 of the body 12, which is the space delimited by the wall 121, and bear flatly against the peripheral lip 122. This can be seen in FIGS. 2 and 3.

The flap 14 comprises cut-outs on one of its faces, in the form of rectilinear grooves 141, which are parallel to one another. These grooves 141 have a V-shaped cross-section here. However, grooves having a differently shaped cross-section, such as a U-shaped or crenellated, can also be provided. The grooves 141 enable the flap 14 to display improved deformation properties, localised at the base of these latter where the material thickness is distinctly reduced. It should be noted that a chess-board pattern of grooves can also be envisaged. These properties are particularly advantageous to allow the flap to hug the shape of the wall of the container on which it is positioned. This will be better explained hereafter.

The stopper 10 finally comprises an arm 16 which here has the shape of a rectangular parallelepiped. This arm is attached to the body 12 by one of its sides and attached to the flap 14 by the opposite side. This arm 16 acts as both a link and a hinge between the body 12 and the flap 14.

The stopper 10 is of the one-piece type. It is obtained preferably by means of a conventional thermoplastic elastomer injection method. Advantageously, the stopper 10 has been designed to be able to be made by means of the most simple possible injection method, so as to limit as far as possible the costs of production and therefore the manufacturing cost price of said stopper. Thus the injection moulds preferably comprise no drawer-type moving piece. Since the moulded material is flexible, it makes it possible, in certain cases to consider only a few ejectors, or even one single main injector, with the item coming out of the mould by means of overall deformation.

The injection of thermoplastic elastomer offers the advantage of being able to be implemented using equipment and a process which are less complex than an elastomer injection method which requires a hot cross-linking step. The time saved in the production cycle is therefore significant. Finally, this thermoplastic elastomer can furthermore be recycled by an ad hoc die, unlike cross-linked elastomers.

Such thermoplastic elastomers have the most advantageous physico-chemical and mechanical properties. Their cost is less than cross-linked elastomers. This makes them the ideal materials.

Amongst the thermoplastic elastomer materials able to be used to produce the device according to the present invention, mention can be made by way of example of the materials marketed by the company Arkema under the trade mark Pebax® (polyether and amide-based copolymers), by the company ExxonMobil Chemical under the trade mark Santoprene® (mixtures of ethylene propylene diene monomer and polypropylene), by the company DMS under the trade mark Arnitel® (polyester copolymer) or again by the company Dupont under the trade mark Hytrel® (polyester thermoplastic elastomer).

Thus, the configuration of the stopper 10 in accordance with FIG. 1 is a flat configuration, such as obtained at the end of the demoulding step of said stopper. In this configuration, the stopper is by no means functional.

In order to make the stopper functional, it is necessary to perform a change of configuration of this. To do this, a rotational movement of the flap 14 is effected in accordance with the arrow F1 in FIG. 1, by torsion of the arm 16, such that the flap is directly above the body 12. The flap 16 is then passed forcibly through the aperture of the though conduit 13 of the body 12, beyond the peripheral lip 122 into the through conduit 13 of the body 12. This step is facilitated by the ability of the flap 14 to deform, which is improved by the presence of the grooves 141. The stopper is then in the configuration shown in FIG. 2 which is the functional configuration.

Figure 3:
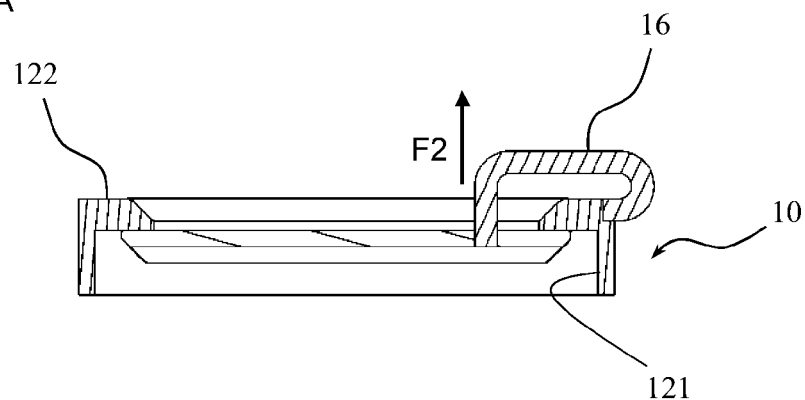
FIG. 3 shows the device according to the present invention, in the form of a stopper in a cross-sectional view along axis A-A obtained from FIG. 2, in its functional configuration, with the flap in the closed position.

In this configuration, the flap 14 comes to bear against the inner face of the peripheral lip 122, as shown in FIG. 3. It is seen that the diameter of the flap at the surface in contact with the peripheral lip 122 is substantially greater than the diameter of the aperture in the body 12 at said peripheral lip 122, such that the flap cannot move out of the body again, without deliberately seeking to make it move out.

In this configuration, the arm 16 is kept twisted and under stress. The elastic properties of the arm 16 allow it to exert upon flap 14 a force which tends to press said flap 14 against the peripheral lip 122, in the direction of arrow F2, thus guaranteeing the stopper's fluid-tightness. In this configuration, which is the configuration in which the flap 14 is closed, the stopper 10 is in a stable configuration, namely the force exerted by the arm 16 described above and the opposite force exerted on the flap 14 by the peripheral lip 122 cancel one another out.

Figure 4:
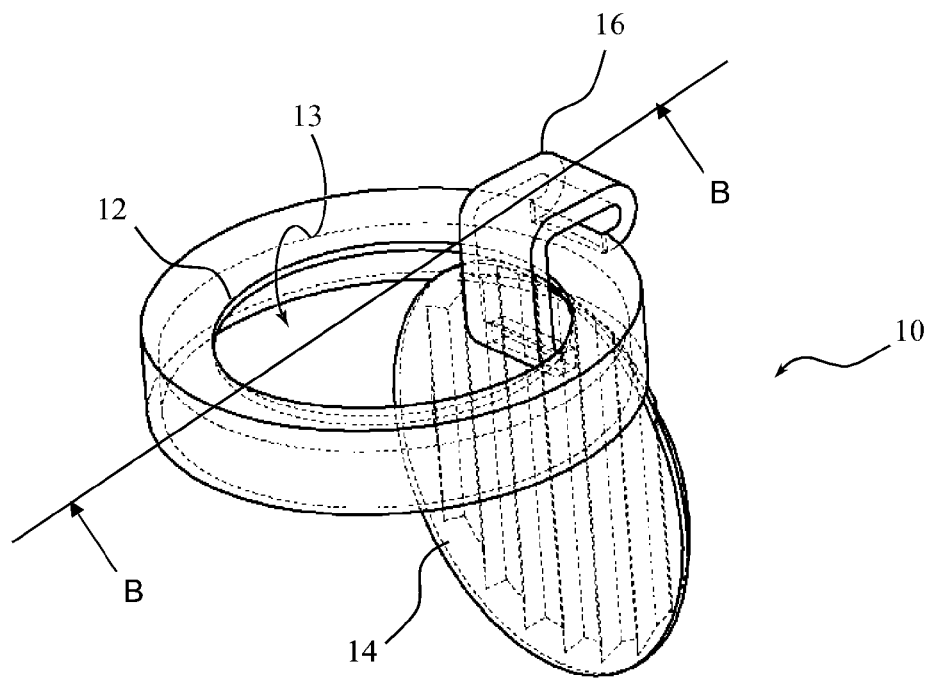
FIG. 4 shows the device according to the present invention, in the form of a stopper, in a perspective view, in its functional configuration, with the flap in the open position.
Figure 5:
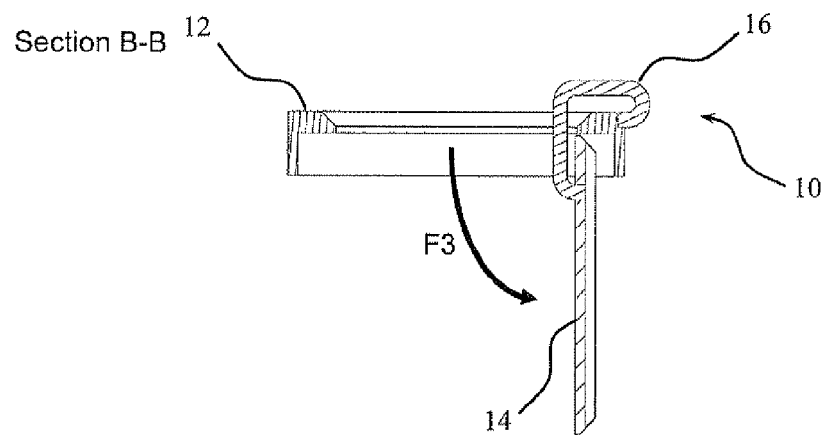
FIG. 5 shows the device according to the present invention, in the form of a stopper in a cross-sectional view along axis B-B obtained from FIG. 4, in its functional configuration, with the flap in the open position.
Figure 6:
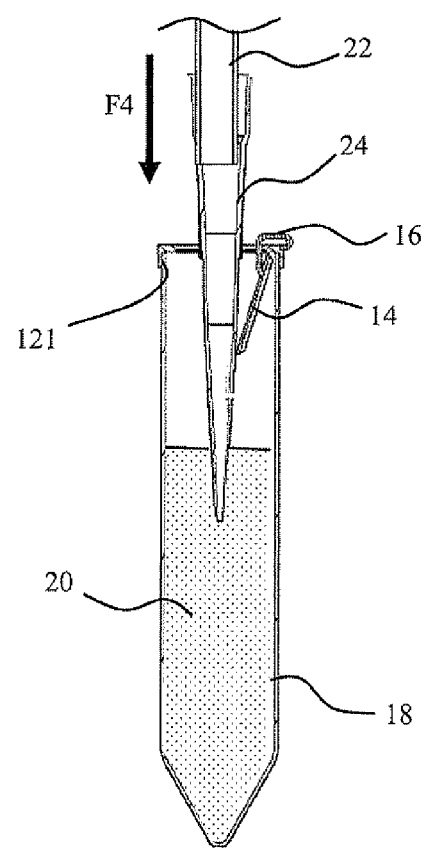
FIG. 6 shows the device according to the present invention, the form of a stopper, positioned on a container of the analysis-tube type, into which an aspiration/discharge is lowered.

The FIGS. 4 to 6 show the stopper 10 according to the invention in the configuration in which the flap 14 is open. In FIGS. 4 and 5, the stopper 10 is shown in configuration in which the opening of the flap 14 is virtually maximal. Indeed, as is clearly seen in these figures, the plane in which the flap 14 is located is substantially perpendicular to the plane of the peripheral lip 122. It should be noted that the opening of the flap 14 can only be obtained by the action of an exterior force shown in FIG. 5, via the arrow F3. Indeed, in this configuration, the elastic stress exerted on the arm 16 is virtually maximal.

The FIG. 6 shows the stopper 10 in the "open configuration" in the case of a conventional use. Indeed, the stopper 10 is positioned here on a substantially cylindrical analysis tube 18 having a circular section, such that the external face of the wall of the tube 18 in its upper part is in contact with the inner face of the wall 121 of the stopper. Furthermore, the peripheral lip 122 of the stopper comes to bear on the edge of the tube 18 at the orifice of the latter. The thermoplastic elastomer material preferably used to produce the stopper according to the invention offers a particular advantage here, namely that it makes it possible to ensure, due to its elastic properties, a good hold of the stopper 12 on the tube 18, once the stopper 12 is forcibly positioned on the tube 18. The fluid-tightness of the tube 18 is then assured.

The tube 18 contains a liquid 20, which is to be sampled or into which another liquid is to be dispensed. To do this, an aspiration/discharge device 22, partially shown in FIG. 6, comprising at its end a disposable plastic sampling cone 24, is brought to bear against flap 14 of the stopper 10 in a vertical translational movement in accordance with the arrow F4. The force exerted by the aspiration/discharge device 22 on the flap 14 by means of the sampling cone 24 causes the flap 14 to open, by elastically stressing the arm 16. The opening of the flap 14 allows the sampling cone to pass through the stopper 10 via the through conduit 13 and enter the tube 18. Of course, all of this sequence is carried out in a continuous manner during the translational vertical displacement of the aspiration/discharge device 22. As it descends into the tube, the sampling cone 24 guarantees the necessary force on the flap 14 to keep it open under stress.

The displacement is interrupted when the disposable cone comes into contact with the liquid. To this end, when the aspiration/discharge device 22 is an automatic device, an integral part of an automatic biological analysis system, it is wise to have on said system a means for detecting the liquid in order to avoid the cone submerging too deeply into the liquid. Such means are well known and widely used in such systems. It is however necessary to make sure that the liquid detection means are not activated when the liquid sampling cone 24 comes into contact with the flap 14 of the stopper 10, causing the vertical translational movement of the aspiration/discharge device 22 to stop.

Once the sampling cone 24 is in contact with the liquid 20, the aspiration/discharge device 22 can either aspirate a fraction of the liquid 20, or discharge a volume of another liquid sampled previously and contained in the sampling cone 24. It should be noted that in the case of a discharge of liquid, it is not necessary for the sampling cone 24 to come into contact with the liquid 20.

Once this fluidic step has been carried out, the aspiration/discharge device 22 then undergoes a reverse vertical translational movement until the sampling cone 24 is once again outside of the tube 18. The force exerted on the flap 14 by the sampling cone 24 as the aspiration/discharge device 22 moves up again allows the flap 14 to be kept open under stress until the sampling cone 24 and the flap 14 is only still in contact through the end of said sampling cone 24. From this moment, as a result of the elastic return force exerted by the arm 16 on the flap 14, this latter undergoes upward movement again concomitantly with the upward movement of the sampling cone 24, whilst remaining in contact with the end of said cone. Advantageously, the flap 14 can comprise on its upper face, namely the face opposed to the face which bears the grooves, a means (not shown) intended to limit the friction between the sampling cone 24 and said flap 14, when said sampling cone 24 has exited the tube. Such a means can be a particular structure of the upper face which makes it grainy. This means can also be a boss on the upper face of the flap 14, which thus limits the contact surface between the sampling cone 24 and the flap 14.

Figure 2:
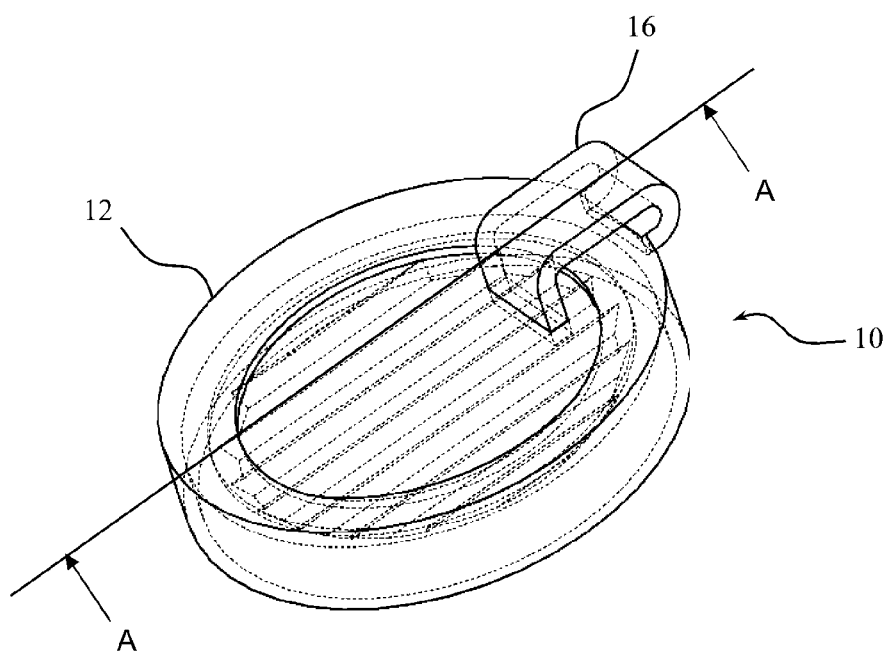
FIG. 2 shows the device according to the present invention, in the form of a stopper in perspective view, in its functional configuration, with the flap in the closed position.

The upward movement of the flap 14 in a substantially rotational movement is achieved when the flap returns to the closed position, namely abutting against the peripheral lip 122 of the body 12, as shown in FIGS. 2 and 3. The stopper is then closed and the fluid-tightness of the stopper 12 is assured once again, which allows it to be transported without the risk of any liquid leaking.

It is quite obvious that all of the steps described above can be carried out manually by a handling technician holding an aspiration/discharge device, such as a pipette or a syringe, in his hand.

Furthermore, in a modification of the invention, it can envisaged to separate the pressure function on the flap from the aspiration/discharge function. To do this, it is possible to have recourse to a device independent of the aspiration/discharge device 22, said device exerting on the flap 14 a pressure which is sufficient to allow the latter to open sufficiently for passage of a sampling cone 24. For example, such an independent device can be a mechanical finger which can be moved vertically.

The stopper according to the invention can be substituted for all of the stoppers or covers positioned on a container and which it is necessary to take off to access or sample the liquid contents, since optimum fluid-tightness is not required. Due to its configuration, the orifice freed when the flap is opened is very large, which allows the passage of large aspiration/discharge devices, which can be relatively flexible and blunt, thus limiting the risk of injury.

Furthermore, such a stopper can be adapted to numerous consumables, devices or containers requiring:
a stable state when in the closed position
an open position through an external mechanical action
an automatic closure by acting on the elastic return force of the material itself when the external mechanical action stops.

The stopper according to the invention can also be adapted to very different container geometries:
in diameter or width
in depth
in the type of materials: polymers, metals, glass, ceramics, silicon . . .

The elastic return force exerted by the arm can advantageously be adapted to the desired use by amending the shape of the latter.

In a more elaborate embodiment, it is possible to envisage manufacturing the stopper at the same time as the container which it must close. Indeed, in the case of a container, such as a tube, produced by injection moulding, it is certainly possible to envisage cast-moulding the stopper on the container during the manufacture of this. This is then a bimaterial injection method. The stopper according to the invention and the container then form a one-piece device.

It can also be envisaged to change the configuration of the device according to the invention in order to use it as a flap valve, to manage fluids (gas, liquids). In this configuration, the valve is positioned between two volume spaces between which a fluid must be transferred. In this case, it is the pressure exerted upstream by the liquid, which forces the valve to open whilst minimising the loss of load due to the diameter of the flap. In the event of depressurisation or reversal of flow, the flap will close again quickly.

The invention claimed is:

1. A one-piece flap device made of elastic material, which separates two distinct volume spaces, said flap device comprising:
    a) a substantially cylindrical body comprising a through conduit,
    b) a flap that seals an aperture of the through conduit of said body when the flap is in a closed position and is within said body, and
    c) an arm connecting the body of said flap device to said flap, said arm being in an elastic stress position regardless of the position of said flap when inside said body, wherein:
    the body comprises at least one peripheral lip;
    a part of an outer face of the flap is pressed against an inner face of the peripheral lip by an elastic force of the arm in the closed position;
        the flap is configured to be moved from the closed position to an open position in a direction that opposes the elastic force of the arm; and
        a first end of the arm is attached to an exterior surface of the body and a second end of the arm is attached to the flap.

2. The one-piece flap device according to claim 1, wherein the arm connects the body of said flap device to said flap through the through conduit of said body.

3. The one-piece flap device according to claim 1, wherein the elastic material is selected from the group consisting of: thermoplastic elastomers; cross-linked or vulcanised elastomers; silicones; fluorosilicones; fluorinated elastomers; polyisoprenes; natural butyl or nitrile rubbers; and fluorocarbon polymers.

4. The one-piece flap device according to claim 1, wherein the flap is substantially flat.

5. The one-piece device according to claim 1, wherein the flap comprises a face comprising grooves.

6. The one-piece flap device according to claim 5, wherein the grooves are configured to facilitate deformation of the flap.

7. The one-piece flap device according to claim 1, wherein the flap is configured to facilitate sliding of an object that allows said flap to open.

8. The one-piece flap device according to claim 1, wherein the body is configured to be positioned on a container.

9. The one-piece flap device according to claim 1, wherein the body is configured to be positioned at an interface between a source container and a destination container or between upstream tubing and downstream tubing.

10. A stopper comprising the one-piece flap device according to claim 1.

11. A method of taking a fraction from a liquid sample contained in a container, sealed by the stopper according to claim 10, said method comprising:
   a) exerting a pressure by means of an aspiration/discharge device on the flap of the stopper, which is in the closed position, in order to allow the flap to be opened, causing the arm of said stopper to be placed under elastic stress;
   b) causing the aspiration/discharge device to penetrate the container until a tip of the aspiration/discharge device is immersed in the liquid sample.
   c) aspirating a determined volume of said liquid sample;
   d) withdrawing the aspiration/discharge device from the container such that the pressure exerted on the flap is discontinued, causing the flap to return to the closed position due to an elastic return force exerted by the arm of said stopper.

12. A method of dispensing a liquid into a container sealed by the stopper according to claim 10, said liquid being contained in an aspiration/discharge device, said method comprising:
   a) exerting a pressure by means of the aspiration/discharge device on the flap of the stopper, which is in the closed position, in order to allow the flap to be opened, causing the arm of said stopper to be placed under an elastic stress;
   b) causing the aspiration/discharge device to penetrate the container;
   c) dispensing into an interior of the container a determined volume of the liquid contained in the aspiration/discharge device;
   d) withdrawing the aspiration/discharge device from the container such that the pressure exerted on the flap is discontinued, causing the flap to return to the closed position due to an elastic return force exerted by the arm of said stopper.

13. A valve comprising the one-piece flap device according to claim 1.

14. A method of transferring a liquid between a source volume space and a destination volume space, the two volume spaces being separated by the valve according to claim 13, said method comprising:
   a) exerting, by means of the liquid to be transferred, a pressure on the flap of the valve that is sufficient to allow said flap to open, causing the arm of said valve to be placed under an elastic stress;
   b) maintaining the pressure for a period of time sufficient to allow transfer of a desired volume of the liquid;
   c) discontinuing the pressure in order to cause the flap to return to the closed position as a result of an elastic return force exerted by the arm of said valve.

15. The one-piece flap device according to claim 1, wherein the arm is attached to the exterior surface of the body and extends through the through conduit of the body when the flap is in the closed position and when the flap is in the open position.

* * * * *